United States Patent Office 3,621,614
Patented Nov. 23, 1971

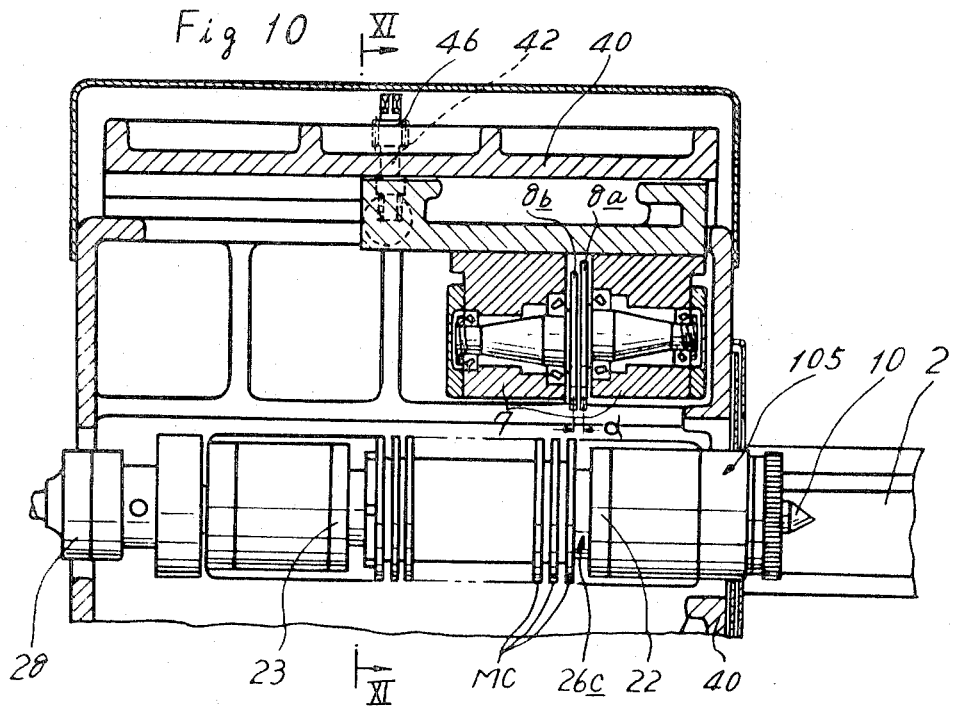
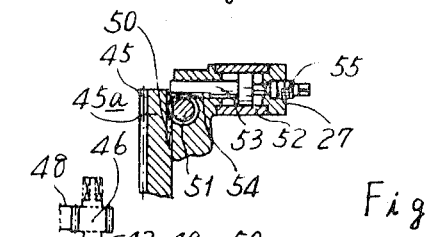
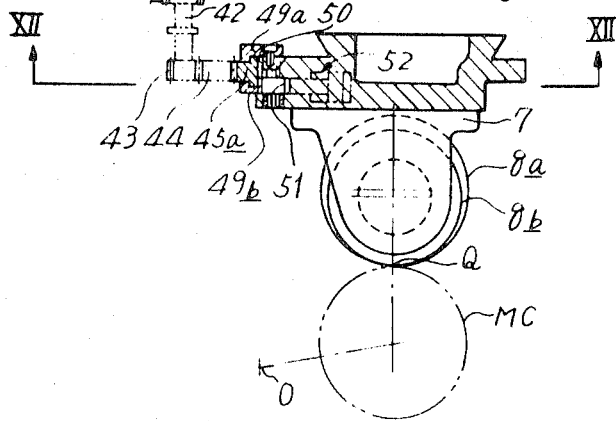

3,621,614
CAM GRINDING MACHINE
Ryotaro Hikita, Riichi Takahashi, Rokuro Kimura, Mikishi Kurimoto, and Teruyuki Ito, Nagoya-shi, and Sadamu Kato, Hekikai-gun, Japan; said Hikita, Takahashi and Kimura assignors to Toyota Central Research and Development Laboratories, Inc., and said Kurimoto, Ito and Kato assignors to Toyoda Machine Works, Ltd., both of Tokyo, Japan
Filed Dec. 23, 1968, Ser. No. 785,897
Int. Cl. B24b 17/00
U.S. Cl. 51—101 R
16 Claims

ABSTRACT OF THE DISCLOSURE

A cam grinding machine for grinding a cam on a workpiece while copying or duplicating a master cam. The machine is equipped with an apparatus for substantially compensating lift error on a workpiece due to grinding wheel wear, said apparatus being provided with a plurality of cam rollers having different diameters including a cam roller which engages with a master cam or master cams, said cam rollers being automatically or manually changed when the grinding wheel diameter is reduced by a predetermined extent, whereby the lift error on the workpiece is substantially compensated.

CAM GRINDING MACHINE

This invention relates generally to grinding machines, and more particularly to an automatically operated cam grinding machine, in which a cam on a workpiece is ground copying or duplicating a master cam and the lift error thereof due to grinding wheel wear is substantially compensated.

In grinding a cam on a workpiece copying or duplicating a master cam, an error is produced on a workpiece in accordance with the changes of the grinding point which is shifted in relation to the curvature changes of the grinding wheel due to reduction of its diameter by wear. This error will be hereinafter referred to as a lift error. Therefore, in the prior art the usable range of grinding wheel diameter has been limited from 610 mm. to 510 mm., for example, in order to keep the lift error within allowable tolerance. It has been discovered, however, by theoretical analysis, that even in cam grinding machines with said allowable diameters, the maximum lift error on a workpiece has become several tens of microns. Many devices have been suggested so far to prevent or compensate the above-mentioned lift error. In one device, the workpiece has been rotated about a shaft situated at fixed position and the axis of a grinding wheel has been moved in cross feed and vertical directions with reference to a workpiece so that a cam profile is generated on a workpiece by the resultant movement.

Theoretically the effect of the grinding wheel wear can be eliminated perfectly because the grinding position on the grinding wheel is not shifted, but practically the mechanism for moving the axis of the grinding wheel has the disadvantages of being complex and weak in construction and inexpensive in manufacture.

In other known devices the axis of the grinding wheel is not moved. Instead the workpiece is moved to generate a cam profile thereon, and different master cams for machining the same cam profile have been provided to be changed when the grinding wheel has been worn by a predetermined extent. One of the faults of this method is that several master cams for machining the same cam are required to compensate for the grinding wheel wear.

It has been found out by theoretical analysis with the present invention that it is possible in the grinding mechanism for generating a cam profile while copying from a master cam, to make the lift error on the workpiece substantially zero by changing the diameter of the roller engaged with a master cam. This is a most important conception applicable directly to a conventional cam grinding machine in order to improve machining accuracy on a workpiece.

In general it is an object of the present invention to provide a machine tool having an apparatus for accomplishing the compensation of the lift error due to the grinding wheel wear by changing the rollers which engage with master cams.

Another object of the invention is to provide a machine tool having apparatus which makes it possible to extend the usable range of the grinding wheel diameter and to perform an accurate machining operation on a workpiece.

Still another object of the invention is to provide integrally formed rollers which are automatically shifted to change the roller engaging one of the master cams so as to maintain the machining accuracy within a required tolerance when the diameter of the grinding wheel has been reduced by a predetermined size.

A further object of the invention is to provide separately formed cam rollers which are automatically shifted to make the engagement with the master cams one by one when the diameter of the grinding wheel has been reduced by a predetermined size.

A further object of the invention is to provide a cam roller having the shape of a circular frustum which may change its effective diameter steplessly.

A still further object of the invention is to provide cam rollers which are manually changeable.

The foregoing and other objects of the invention, which will become more fully apparent from the following detailed description, may be achieved by means of the exemplifying apparatus depicted and set forth in this specification in connection with the accompanying drawings, in which.

Figure 3:
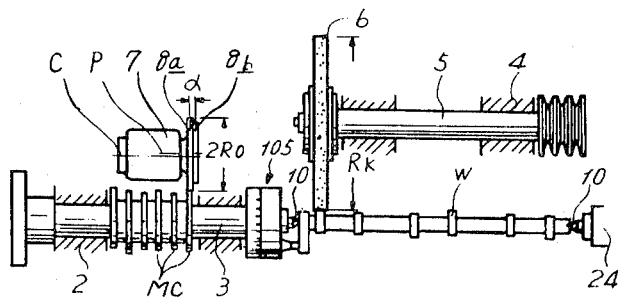
Figure 4:
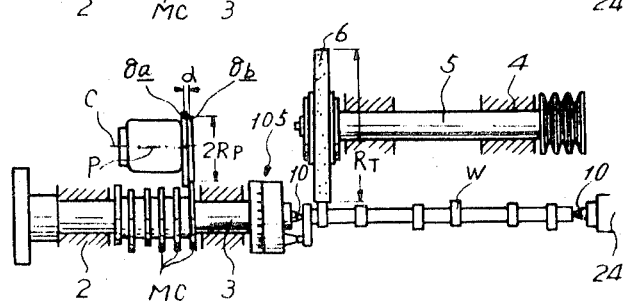
Figure 5:
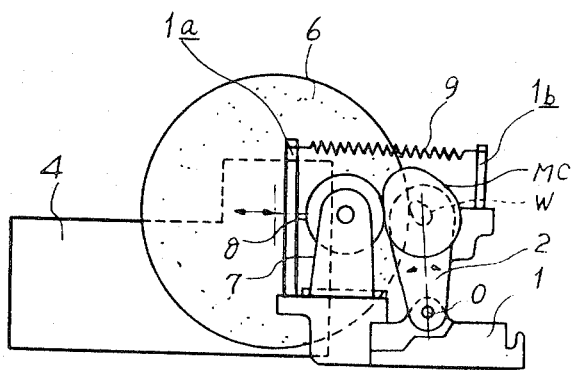
Figure 6:
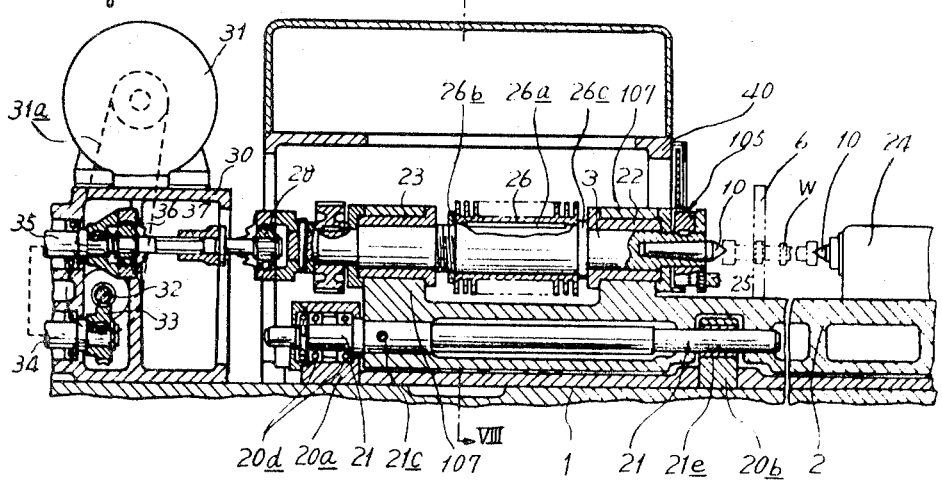
Figure 7:
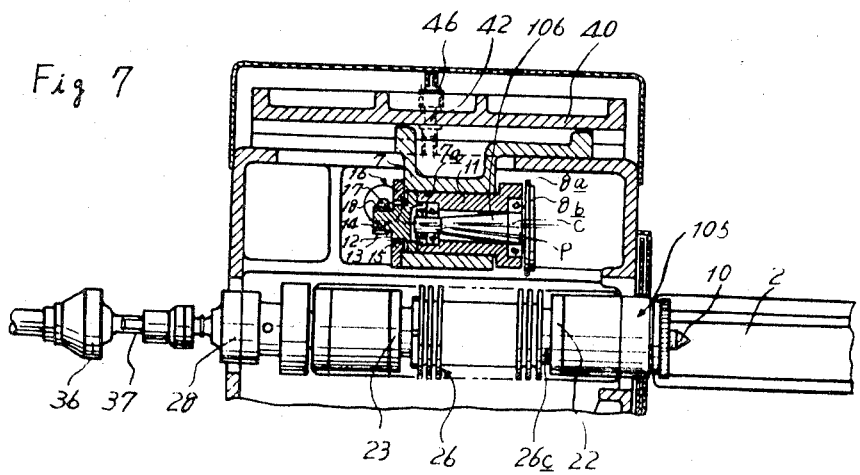
Figure 8:
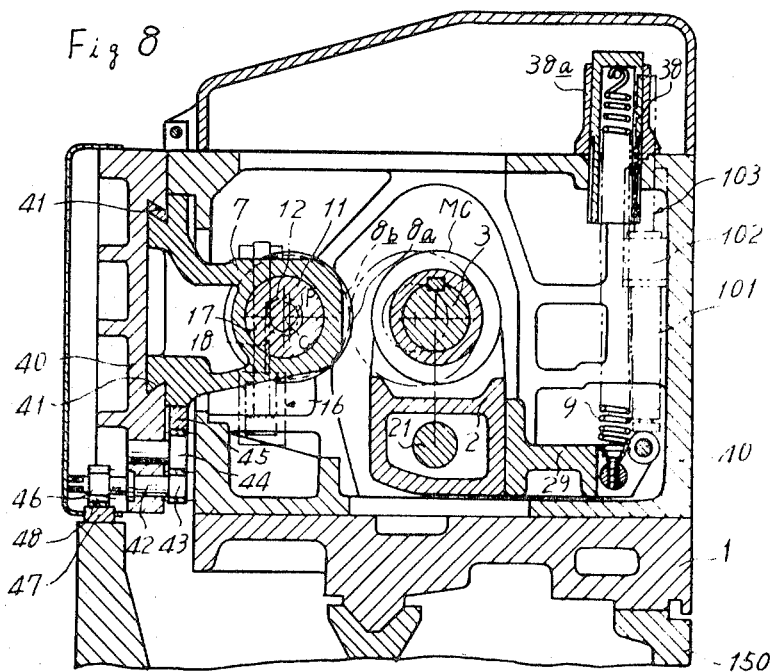
Figure 9:
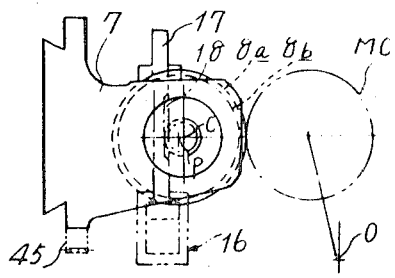
Figure 13:
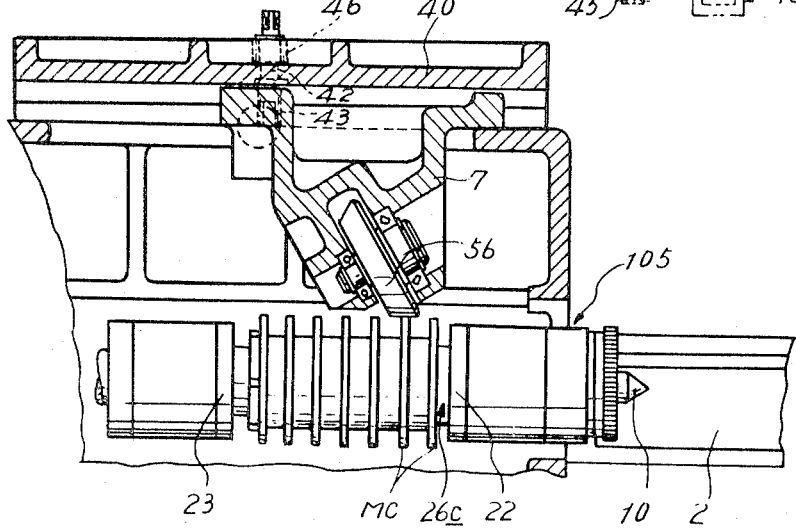

FIGS. 3 to 5 inclusive show the essential parts of an embodiment according to the invention;

FIG. 6 is a vertical sectional view through the work head showing the master cam assembly and associated parts;

FIG. 7 is a plan view containing a partial sectional view of the work head;

FIG. 8 is a sectional view taken on the line VIII—VIII of FIG. 6 and showing the engagement of the smaller diameter roller and the master cam;

FIG. 9 is a fragmentary view showing the engagement of the larger diameter roller and the master cam;

FIG. 10 is another embodiment according to the invention, showing a horizontal sectional view of master cam assembly and partly in elevation;

FIG. 11 is a fragmentary sectional view taken on the line XI—XI of FIG. 10;

FIG. 12 is a fragmentary sectional view taken on the line XII—XII of FIG. 11;

FIG. 13 is a further embodiment according to the invention, showing a horizontal sectional view of master cam assembly and partly in elevation.

Figure 14:
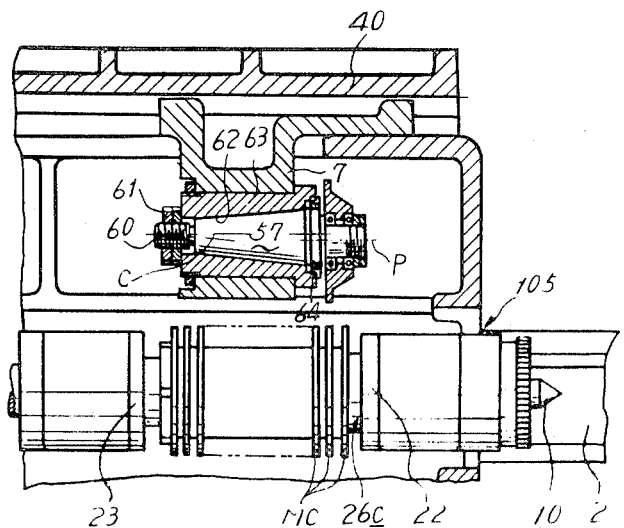
Figure 15:
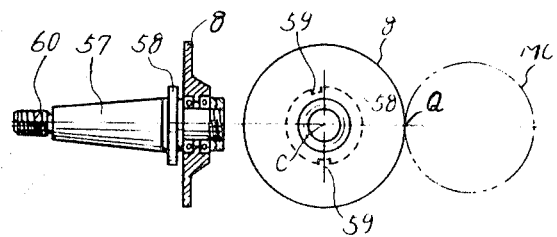
Figure 16:
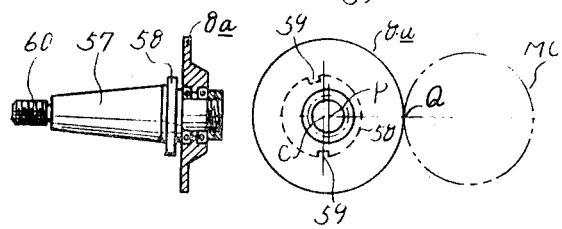
Figure 17:
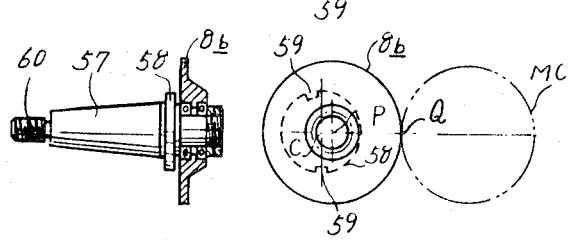
Figure 18:
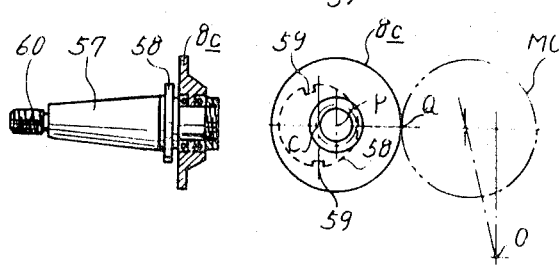

FIG. 14 is a still further embodiment according to the invention, showing a horizontal sectional view of master cam assembly but showing certain of the parts in elevation.

Figure 19:
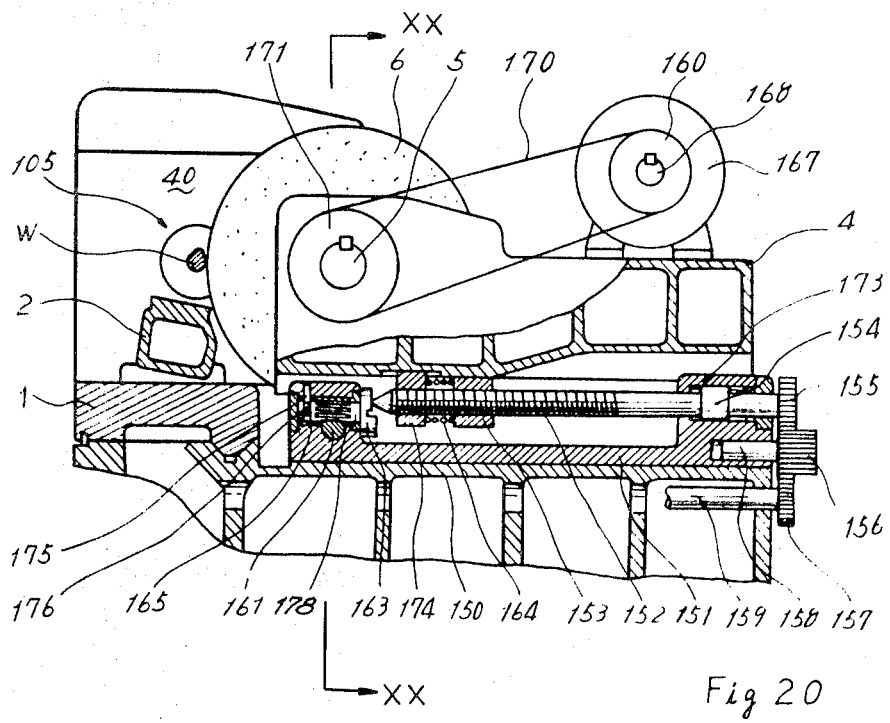
Figure 20:
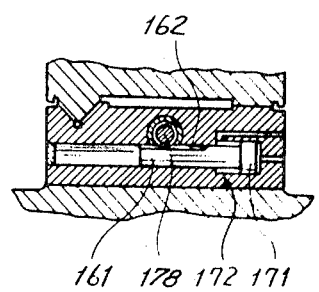

FIGS. 15 to 18 inclusive show cam rollers having different diameters for manual change;

FIG. 19 is a sectional view showing a cam grinding machine according to the invention, but showing certain of the parts in elevation;

FIG. 20 is a fragmentary sectional view taken on the line XX—XX of FIG. 19; and

Figure 21:
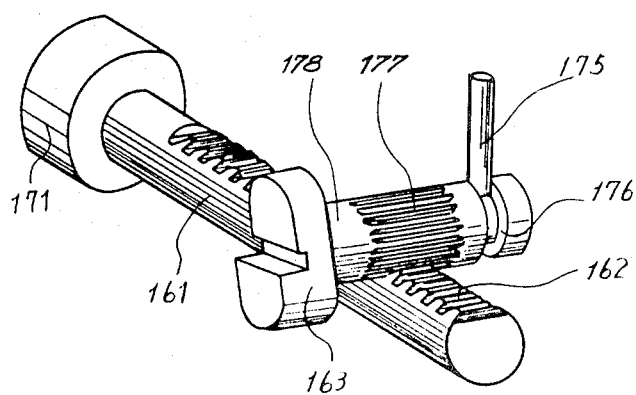

FIG. 21 is a view of essential parts of a position regulating means in enlarged scale.

Figure 1:
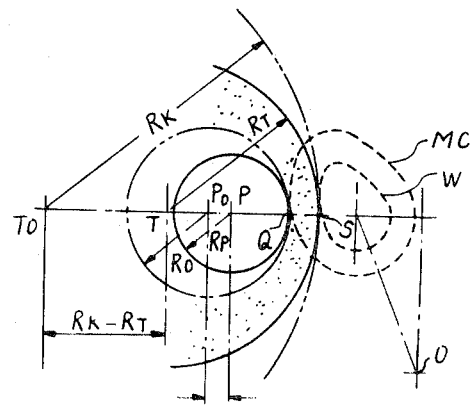
FIG. 1 is a diagram showing the principle according to the invention for compensating lift error on a workpiece due to grinding wheel wear.

Referring now to FIG. 1 illustrating the principle of the invention, a workpiece W and a master cam MC are co-axially supported and rotated synchronously by a power means (not shown). Master cam MC has a form corresponding to the shape of a cam to be generated on the workpiece W. When the master cam MC is rotated by the power means, the axis of the workpiece W is moved through engagement between the master cam MC and a cam roller having a radius RO. The workpiece W is machined copying the master cam MC by a grinding wheel having a radius RK (shown in phantom line) without any substantial errors so that the radius RK of the grinding wheel and the radius RO of the cam roller has relationship to produce zero lift error on the workpiece W. When the grinding wheel has been worn to the predetermined radius RT in the grinding operation and meanwhile the axis of the grinding wheel has also been advanced by a distance (RK-RT) equal to the grinding wheel wear, the cam roller is changed to a smaller one having a radius RP and the axis of the roller is shifted from point PO to point P so as to make the peripheries of the smaller roller and the larger roller coincide at a point Q, whereby the lift error on the workpiece W may be substantially eliminated in spite of the reduction of the grinding wheel diameter.

Figure 2:
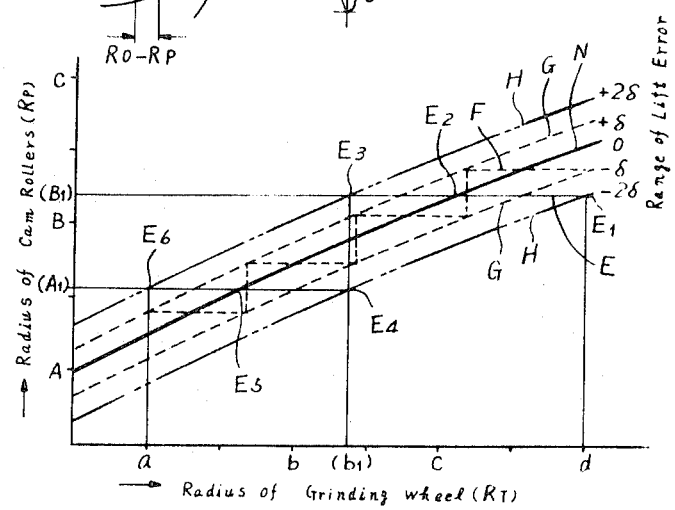
FIG. 2 is a diagram showing lift error on the workpieces as a function of the radii of the grinding wheel and the cam roller.

Referring now to FIG. 2, a full line N illustrates a situation where it is regarded that there are not substantially any errors on the workpiece W and indicates that it is required to change steplessly the radius of the roller to keep a zero lift error. The portion between two dotted lines G and G is the range of the error $\pm \delta$ while the portion between two phantom lines H and H is the range of the error $\pm 2\delta$.

Assuming that the lift error on a workpiece is required to maintain within the range of the error $\pm 2\delta$, grinding operation is begun at a point $E_1$, where there is an error of almost $-2\delta$ and the radii of grinding wheel and cam roller are chosen, at $d$ and $B_1$ respectively, as shown in FIG. 2. The lift error on the workpiece W decreases along a thin full line E in accordance with the wear of the grinding wheel till crossing point $E_2$ wherethere are not any errors on the workpiece.

Upon further wear of the grinding wheel, the error begins to increase till a point $E_3$ where there is an error tlmost $\pm 2\delta$ and the grinding operation using cam roller of the radius $B_1$ should be ended in order to maintain the lift error on the workpiece within $\pm 2\delta$.

Thus, the cam roller having radius $B_1$ is changed into the cam roller having radius $A_1$ smaller than before. The error on the workpiece becomes almost $-2\delta$ (point $E_4$) and again begins to become smaller till crossing point $E_5$ and thence larger in the opposite direction till point $E_6$ in the same manner as above mentioned according to the wear of grinding wheel. The point $E_6$ is the limitation for the grinding operation with the cam roller having radius $A_1$. In other words, the lift error on a workpiece is maintained within $\pm 2\delta$ over the extended range from $d$ to $a$ of grinding wheel radius by changing the cam roller having radius $B_1$ with the cam roller having radius $A_1$ when the radius of the grinding wheel becomes $b$. In the embodiments according to the invention, it has been brought out by theoretical analysis that two rollers having different diameters enable the lift error to remain within $\pm 8$ microns using the radius from 305 mm. to 240 mm. of the grinding wheel.

When the range of allowable error within $\pm \delta$ is required, four cam rollers having different diameters should be changed to keep the required error over the same range of the grinding wheel diameter as in the above-mentioned case, as illustrated by the thin dotted line F in FIG. 2.

A first embodiment according to the invention is provided with two different diameter cam rollers that engage with master cams MC in a predetermined order as schematically shown in FIGS. 3, 4, and 5. For better understanding, FIGS. 3 to 5 inclusive show the essential assembly of a cam grinding machine which performs grinding operations copying master cams MC. A headstock 105 including a rotatable work spindle 3 having a work center 10 and a footstock 24 having a work center 10 are provided in facing coaxial relation. A workpiece W aligned with work spindle 3 is supported between work centers 10 and 10 and rotated in synchronism with the spindle 3. A plurality of the master cams MC is secured on the spindle 3 journaled in a swing table 2 which is pivotably mounted on a traverse table 1 by a shaft O (FIG. 5). Cam rollers 8a and 8b having different diameters are rotatably mounted on a supporting means 7 which is slidably mounted on traverse table 1 in a position corresponding to the location of the master cam. A tension spring 9 (FIG. 5) is interposed between rods 1a and 1b extending from the traverse table 1 and the swing table 2 respectively and serves normally to urge the master cams MC toward the cam rollers. A grinding wheel 6 is fixed at one end of a wheel spindle 5 journaled on a wheel slide 4 which is moved toward and from workpiece W so as to make grinding engagement with the workpiece W. When the master cam engaging with the cam roller 8 rotates, the axes of the spindle 3 and the workpiece W, aligned with each other, swing about the shaft O as fulcrum to generate desired cam profile copying the master cams MC. FIG. 3 illustrates the engagement of one of the master cams and the larger diameter cam roller 8a. The axis P of the latter is in a position farther from the axis of the spindle 3 than that C of the supporting means 7. The smaller diameter cam roller 8b engages with the master cam MC, as shown in FIG. 4, as the cam rollers are shifted to left hand by a distance $\alpha$ with respect to the master cam and the rotation axis P of the cam rollers into a nearer position to the spindle 3 than that of the supporting means 7. The grinding conditions from using a grinding wheel with no wear till its wear comes to the maximum allowable limit are shown in FIG. 3. The condition in which the wear of the wheel exceeds that limit is shown in FIG. 4.

The shifting mechanism and its associated assembly are shown in FIGS. 6 to 9 inclusive. The two integral cam rollers 8a and 8b having different diameters are provided with a shank 106, the axes of the cam rollers 8a and 8b and the shank 106 coinciding.

The shank 106 is rotatably mounted on anti-friction bearings in an opening bore with an eccentricity equal to half the radius-difference between the radii of the cam rollers 8a and 8b in a sleeve 11 which is telescopically mounted in a bore 7a extending through supporting means 7. The sleeve 11 is slidable axially and angularly in relation to the supporting means 7. A member 14 is secured to the left hand end of the sleeve 11 and formed with a pinion 12 at left hand end on the periphery thereof and an external thread 13 intermediate its ends so as to threadedly engage with a nut 15 which is fixed to left hand end of the supporting means 7.

A rack 18 formed on a piston rod 17 which is contained the sleeve 11 is rotated 180° angularly and moved axially in relation to the supporting means 7 by means of the thread 13 so as to shift cam rollers to the position corresponding to the smaller diameter cam roller 8b to the master cam MC and to move the rotation axis of the within a reciprocatory power motor 16 is engaged with the pinion 12. When the fluid pressure is applied to the piston, roller to such position that the smaller diameter roller 8b engages with the master cam at the same position with the cam roller 8a.

The swing table 2 is pivotably supported by a trunnion shaft 21 journaled on the supporting members 20a and 20b which extend from traverse table 1, as shown in FIG. 6. The swing table 2 and the trunnion shaft 21 are retained for mutual movement by a pin 21c. The left end of the shaft 21 is carried on anti-friction ball bearings 20d which are inserted in a hole formed in the supporting member 20a and the right end thereof is carried on a journal bearing 21e mounted in the supporting member 20b. A headstock 105, including the spindle 3, a work center 10, a dog 25 and the master cams MC, is provided on protruding portions 107 of the swing table 2. The spindle 3 is carried on journal bearings 22 and 23 mounted in bores in the protruding portions 107 of the swing table 2. A footstock 24 having a work center 10 aligned with the spindle 3 is provided on the swing table 2 at the right hand end. A work center 10 aligned with the axis of the spindle 3 and the protruding dog 25 for driving the workpiece W are provided on the right hand end of the spindle 3. A member 26 is mounted on the spindle 3 and retained for rotation therewith by a key 26a and from axial movement thereon by a nut 26b and protruding portion 26c in the middle of the spindle 3.

The member 26 has a plurality of master cams formed as different cam profiles corresponding to cams on the workpiece W, the master cams being provided with pitches of equal distance therebetween. However, it should be understood that a plurality of the master cams MC is not essential, but that when a single cam is machined, one master cam is sufficient for the purpose of the invention. The rotation of an electric motor 31 mounted on a reduction box 30 is transferred to a shaft 34 through V-belts 31a, a worm 32 and worm wheel 33 and thence to a shaft 35 which is mechanically connected with the shaft 34 and then to the spindle 3 through a universal joint 36, a telescopic spline joint 37 and a universal joint 28 fixed to an end of the spindle 3, whereby the spindle 3 is rotated by the electric motor 31, as shown in FIG. 6.

One end of a spring 9 is fixed to adjacent right end of an arm 29 which is secured to the right side of the swing table 2, while the opposite end of the spring 9 is secured within a blind bore formed in a sleeve 38 which may be moved by turning a nut 38a and retained for rotation by a pin (not shown) (FIG. 8). The right end of the arm 29 is urged downwardly by a piston rod 101 connected to a piston 102 which is contained in reciprocatory power motor 103 when the rollers are shifted from one of master cams to another whereby the collision between the rollers and the master cams is avoided.

The supporting means 7 which is slidably mounted on a dovetail guide 41 formed in a frame 40 is movable in parallel with the axis of the spindle 3. A rack 45 fixed on the lower side of the supporting means 7 is connected to a star gear 46 through a gear 44 rotatably supported by the frame 40, and a pinion 43 fixed to the shaft 42 which is journaled on the frame 40 in order to advance the supporting member 7 in relation to the master cams MC by one pitch of the latter by means of the incremental movement of the star gear 46. The star gear 46 is advanced one by one of its teeth by engaging dogs 48 on a dog bar 47 mounted on the bed with predetermined distances corresponding to the cam intervals on the workpiece W, when the traverse table 1 on the usual flat way and V-way formed on a base 150 is indexed longitudinally.

Thus the relative position of the master cams MC and the cam rollers 8a and 8b is changed automatically as well as the relative position of the grinding wheel 6 and the cams on the workpiece W. The mechanism as above mentioned is necessary when a master cam for each cam to be ground is used. In case the cams have the same cam profile or only one cam is ground, the mechanism for moving the cam rollers is preferably omitted. In a cam grinding machine having the above mentioned arrangement, the grinding wheel is simply fed into the workpiece W until the finished size of the latter, because the workpiece W is operated by copying the master cam MC so as to generate the cam profile, and when the cam roller 8a is changed for the cam roller 8b, the final position for forward movement of the grinding wheel need not be shifted because the axis of the roller 8b is advanced toward the master cams in order to make the points engaging with the master cams coincide. While the grinding wheel diameter is large, the grinding operation is performed in the same way as a prior cam shaft grinding machine by copying the master cam with the larger diameter roller 8a.

When the traverse table 1 is indexed from the previously ground cam to the next cam on the workpiece W and the star gear 46 is engaged with the dog 48 fixed on the dog bar 47, the supporting means is shifted with respect to the master cam MC through the star gear 46, the shaft 42, the pinion 43, the gear 44 and the rack 45 so that the next cam on the workpiece is machined copying the adjacent master cam. As a plurality of workpieces W is ground successively and the diameter of the grinding wheel is reduced to the predetermined diameter by grinding and dressing, the larger diameter cam roller engaging with the master cam is changed for the smaller diameter cam roller responding to a grinding wheel diameter by checking the diameter with a counter or by detecting amounts of wear with a precision snap action switch (not shown) for detecting the position of the grinding tool.

This changing operation of the rollers is performed by fluid under pressure introduced into the reciprocatory power motor 16 as above mentioned in connection with FIG. 7, whereby the lift error on the workpiece W is maintained within the required tolerance even if the diameter of grinding wheel is further reduced.

A modified form of the invention is illustrated in FIGS. 10, 11 and 12. The modified form of the invention is particularly related to modified rollers and mechanism for changing the engagement between the master cams MC and the larger diameter roller or the smaller diameter roller. Two rollers having different diameters 8a and 8b are separately supported by a supporting means 7. The axes of the rollers 8a and 8b are provided in parallel with a distance equal to the difference of their radii so that the engaging points on the peripheries of the rollers 8a and 8b coincide at a point Q as shown in FIG. 11. The supporting means 7 for rotatably supporting the rollers 8a and 8b is slidably mounted on the frame 40 and indexed one pitch of the master cams through the engagement of the dog 48 and the star gear 46 and through the pinion 43, the gear 44 and rack 45a in the same manner as described in the above-mentioned embodiment.

In FIGS. 11 and 12 which show a mechanism for changing the engagement from and with larger diameter roller 8a to and with the smaller diameter roller 8b, a rack member 45a which is slidably supported by the guides 49a and 49b fixed on the supporting means 7 is engaged with a pinion 51 which is rotatably supported with the supporting means 7. The pinion 51 is meshly engaging with a rack 54 formed on a piston rod 53 carried in a hydraulic motor 52. Said hydraulic motor 52 performs relative movement for shifting the rollers by amount α so as to change the engagement from and with the larger diameter roller 8a to and with the smaller diameter 8b through the piston rod 53, the pinion 51 and the rack member 45a. The amount of movement is defined through controlling the stroke of the piston rod by a stop 55 which is threadedly engaged with a cylinder plate 27. At the time of changing said cam rollers 8a and 8b, a means (not shown) such as a means for locking the star gear by engaging with two dogs at the same time is necessary for preventing the rotation of the star gear 46.

In the second modified form according to the invention the hydraulic motor 52 performs operation for changing the rollers when the grinding wheel is worn by the predetermined size, whereby the lift error due to the reduction of the grinding wheel diameter is compensated.

A third modified form of the invention is particularly related to a modified cam roller as shown in FIG. 13. Said modified roller 56 which is formed as a circular frustum is rotatably supported by the supporting means 7. The axis of the roller 56 is provided in oblique relation to the axis of the spindle 3 so that the periphery surface of the roller 56 which engages with the master cams becomes parallel with the axis of the spindle 3. The roller 56 is changed from engagement with one of the master cams to another by the same mechanisms as explained incorporating with FIGS. 8 and 10. As the diameter of the roller 56 is reduced from the bottom to the top (from right to left in FIG. 13), the effective diameter of the roller 56 may be reduced when the roller 56 is moved leftwardly with reference to the master cam MC in the state that the star gear 46 is retained for rotation. The mechanism for changing the effective diameter of the roller 56 may be employed the same as the last mentioned embodiment or well-known mechanisms per se such as a ratchet mechanism.

In contradistinction to the above-mentioned embodiments in which the rollers are changed automatically, rollers having different diameters are changed manually in the fourth embodiment of the invention illustrated in FIGS. 14 to 18 inclusive. Cam rollers 8, 8a, 8b and 8c are rotatably carried on one end of taper shanks 57. Each axis P of cam rollers 8a, 8b and 8c is provided with an eccentricity equal to the difference between the radii of the roller 8 and each of the cam rollers. Two grooves 59 for regulating the angular position of shank 57 are formed on the flange 58 protruding at adjacent end thereof. A sleeve 63 formed a taper bore 62 fitted to taper shanks 57 is fixed to the supporting means 7 and has extending portions 64 on right end thereof for engagement with said grooves 59. The different diameter rollers are preferably changed from larger diameter to a smaller one in accordance with the reduction of grinding wheel diameter. In the manual changing operation of the rollers, roller and shank 57 are treated as a unit assembly.

After taking off the previously used roller assembly, a new assembly having a roller which is smaller in diameter than before is inserted into the taper bore 62 and fastened by nuts 61 and thread 60 formed on the other end of the shank 57. In this embodiment that portions Q of the roller peripheries which engage with the master cams MC are always maintained in alignment in spite of the different diameters through changing the rotation axis P of each roller from the axis C of the shanks 57 and regulating the rotation axis circumferentially by engagement between the grooves 59 and the portions 64.

In the above-mentioned embodiments, the axes of rollers are shifted so as to align the portions Q engaged with master cams. It should be understood that as the lift error on the workpiece due to the diameter reduction of the grinding wheel is compensated by changing the roller diameter, means for shifting the axes of the rollers are equipped to maintain the grinding surface of the grinding wheel at a constant position. With change of the roller diameter and without shift of the roller rotation axes, it is possible to compensate the lift error on the workpiece by shifting the grinding surface of the grinding wheel by the distance corresponding to the radius difference between the cam rollers.

The mechanism for locating the slide 4 at retracted position is shown in FIG. 19 which is a partial sectional view illustrating the slide 4, the base 150 and the traverse table 1. A slide base 151 is fixed on the base 150. The slide 4 is slidably mounted on the usual flat way and V-way formed on the slide base 151 and arranged for a traverse feeding movement relative to the base 150 to feed the grinding wheel 6 toward and from the workpiece W to be ground. An electric motor 167 on the slide 4 is provided with a motor shaft 168 carrying a multiple V-groove pulley 160 which is connected by multiple V-belts 170 with a multiple V-groove pulley 171 mounted on the spindle 5. Thus the grinding wheel 6 on the spindle 5 is rotated for performing machining operation on the workpiece W.

A wheel feed mechanism may comprise a rotatable feed screw 152 supported by the slide base 151 at an adjacent right hand end. The feed screw 152 engages a feed nut 153 depending from the underside of the slide 4 and a nut 174 slidably supported with the slide 4.

A compression spring 164, which serves to eliminate the backlash between the feed screw 152 and the feed nut 153, is interposed between a pair of nuts 153 and 174. A piston 154 formed at adjacent right hand end of the feed screw 152 is slidably accommodated in a chamber in the slide base 151 and serves to support feed screw 152. The piston on the feed screw 152 and the chamber form a power motor 173 which enables to move the slide 4 left and right.

A gear 155 is mounted on the right hand end of the feed screw 152 which engages with a pinion 156 which is rotatably mounted on a shaft 158 fixed to the base 150. The pinion 156 is longer in width than the gear 155 so as to meet the axial movement of the gear 155 by the power motor 173 and further engages with a gear 157 secured to a feed shaft 159. The feed shaft is rotatably supported by the base 150 and connected to a feed wheel and a power motor (not shown). A rotary motion of the feed shaft 159 by either manual force or the power motor is transferred to the feed screw 152 to impart a corresponding traverse movement to the slide 4 and the grinding wheel 6 through the gear 157, the pinion 156, the gear 155 and the assembly of the feed screw 152 and the nut 153.

A position regulating means is provided at the left hand end of the slide base 151. The position regulating means includes a rack 162 formed on the piston rod 161, a pinion 177 engaging with the rack 162 and an abutment block 163 for changing the advance position of the slide 4 corresponding to the radius difference between a new cam roller and the previously used cam roller. The pinion 177 is formed on a shaft 178 which is rotatably supported with a bearing 165 mounted in the slide base 151. The abutment 163 is fixed at the right hand end of the shaft 164 (FIG. 19) and has protruding portions which are corresponding to the cam rollers in the number and the radius difference therebetween in the length.

At adjacent right hand end of the shaft 178 (FIG. 21), there is provided an annular groove 176 which is engaging with a pin 175 which is secured to the slide base 151 and serves to prevent the shaft 178 from axial movement. The piston rod 161 is movable left and right by the movement of a piston 171 on the right hand end thereof which is slidably accommodated in a chamber formed in the slide base 151 whereby a power motor 172 is formed.

When the diameter of the grinding wheel 6 has been reduced by predetermined size and the cam rollers have been changed from the larger diameter roller to the smaller diameter roller, the slide 4 is retracted by the power motor 173 at first and a longer protruding portion on the abutment block 163 is indexed to the engaging position with the feed screw 152 by the power motor 172 so that when the slide 4 is advanced by the power motor 173 again, the slide 4 is located at the retracted position by a distance corresponding to the radius difference between the new cam roller and the previously used cam roller.

In a cam grinding machine having the mechanism for locating the slide 4 at retracted position when the cam rollers are changed or the cam roller is shifted relative to the master cams, the device for shifting the axes of the cam rollers or the axis of the cam roller may be abolished. The cam rollers or cam roller can be used in the cam grinding machine with slight modifications to the above-mentioned embodiments. In the embodiment shown in FIGS. 3 to 8 inclusive, the roller changing means including an eccentric sleeve 11, a thread 13 formed on the member 14 fixed to the sleeve 11 and the power motor 16 is omitted, and the cam rollers are formed coaxially and mounted on a coaxial sleeve instead of the eccentric sleeve 11.

In the embodiment shown in FIG. 10 the mechanism for changing from the cam roller 8a to 8b to make engagement with one of the master cams is also eliminated, and the axes of a pair of cam rollers 8a and 8b should be aligned or the rollers 8a and 8b should be formed integrally and coaxially on a single shank.

In the embodiment shown in FIG. 13 the axis of the taper roller 56 should be provided in parallel with the spindle axis, but in this case the master cam periphery should be formed to fit the taper periphery of the roller 56.

In the embodiment shown in FIGS. 14 to 18 inclusive, it is sufficient to provide each axis of the rollers 8, 8a, 8b, and 8c in aligment with each axis of the shanks 57.

Although the illustrated means for automatically changing the cam rollers have two different diameter cam rollers for the purpose of disclosing practical operative structures, it is to be understood that the invention is not limited thereto, for the number of the rollers are determined by the required tolerance of the workpiece and the usable range of the grinding wheel diameter.

While the invention has been described by means of specific examples and in specific embodiments, it should be understood that the novel characteristic of the invention may be incorporated in the other structural forms without departing from the spirit and scope of the invention as defined in the subjoined claims.

What is claimed is:

1. A cam grinding machine comprising a base, a traverse table slidably mounted on said base, a swing table pivotably mounted on said traverse table, a headstock provided on said swing table including a rotatable spindle having a work center, a footstock mounted on said swing table and having a work center, a master cam mounted on said spindle axially aligned with the work centers on said headstock and said footstock, said master cam being rotated synchronously with a workpiece supported between said work centers, a grinding wheel mounted on a slide which is movable toward and from the workpiece, a roller supporting means mounted on a frame on said traverse table, a plurality of cam rollers rotatably supported on said roller supporting means and having different diameters, means operably connected to urge elastically said master cam toward said cam rollers for making engagement between one of said cam rollers and said master cam at a time, power means operably connected to rotate said master cam and the workpiece synchronously in order to generate a cam profile on the workpiece cooperating with said grinding wheel, and roller changing means operable to change said cam rollers having different diameters when the diameter of said grinding wheel has been reduced by predetermined size, said roller changing means comprising means for shifting at least one of said cam rollers in axial direction and means for moving at least one of said cam rollers toward said master cam, whereby the lift error on the workpiece due to the diameter reduction of said grinding wheel is substantially compensated.

2. A cam grinding machine as claimed in claim 1, wherein said cam rollers are formed integrally and coaxially with one another on a shank carried on said roller supporting means, and said roller changing means includes a power motor, an eccentric sleeve to receive said shank and a thread formed on said sleeve; said power motor being operable to move said cam rollers radially and axially cooperating with said sleeve and said thread.

3. A cam grinding machine as claimed in claim 1, wherein said cam rollers are separately carried on said roller supporting means and the axes of said cam rollers being located at different distances from the axis of said spindle so as to align each portion of said cam rollers which engages with said master cam, and said roller changing means includes a rack formed on said supporting means, a power motor, and a pinion interposed between said rack and power motor so as to move said supporting means by the force produced in said power motor to change said cam rollers from the larger diameter roller to the smaller diameter roller so as to be engaged with said master cam.

4. A cam grinding machine as claimed in claim 1, wherein each of said cam rollers is manually changeable and rotatably mounted on each of roller supporting shanks with eccentricity equal to the radius difference between the largest diameter in said cam rollers and each of said cam rollers in the rest so as to align each portion of said cam rollers which engages with said master cam, and said roller changing means including a thread formed on each of said roller supporting shanks and at least a nut threadedly engaging with said thread.

5. A cam grinding machine comprising a base, a traverse table slidably mounted on said base, a swing table pivotably mounted on said traverse table, a headstock provided on said swing table including a rotatable spindle having a work center, a footstock mounted on said swing table having a work center, a plurality of master cams mounted on said spindle and axially aligned with the work centers on said headstock and said footstock, said master cams being rotated synchronously with a workpiece supported between said work centers, a grinding wheel mounted on a slide which is movable toward and from the workpiece, roller supporting means mounted on a frame on said traverse table, a plurality of cam rollers rotatably mounted on said roller supporting means and having different diameters, shifting means for shifting said cam rollers through said roller supporting means by one pitch of said master cams when a cam profile generating process is performed, means operably connected to urge elastically said master cams toward said cam rollers for making engagement between one of said cam rollers and one of said master cams at a time, power means operably connected to rotate said master cams and the workpiece cooperating with said grinding wheel, and roller changing means mounted on said roller supporting means and operable to change said cam rollers from the larger diameter roller to the smaller diameter roller when the diameter of said grinding wheel has been reduced by predetermined size, said roller changing means comprising means for shifting at least one of said cam rollers in axial direction, and means for moving at least one of said cam rollers toward said master cam, whereby the lift error on the workpiece due to the diameter reduction of said grinding wheel is substantially compensated.

6. A cam grinding machine as claimed in claim 5, wherein said cam rollers are rotatably supported on said roller supporting means and formed integrally and coaxially with each other, and said roller changing means including an eccentric sleeve to carry said cam rollers, a thread formed on said sleeve and a power motor for changing said rollers cooperating with said eccentric sleeve and said thread.

7. A cam grinding machine as claimed in claim 5, wherein said cam rollers are separately carried on said roller supporting means, the axes of said cam rollers being located at different distances from the axis of said spindle so as to align portions of said cam rollers which respectively engage with said master cams.

8. A cam grinding machine as claimed in claim 5, wherein said cam rollers are rotatably mounted on roller supporting shanks with eccentricity equal to the radius difference between the cam rollers so as to align portions of said cam rollers which respectively engage with said master cams, and said roller changing means includes a thread formed on each of said shanks and at least a nut to be engaged with said thread for manual change.

9. A cam grinding machine comprising a base, a traverse table slidably mounted on said base, a swing table pivotably mounted on said traverse table, a headstock provided on said swing table including a rotatable spindle having a work center, a foodstock mounted on said swing table having a work center, a master cam mounted on said spindle and axially aligned with the work centers on said headstock and footstock, said master cam being rotated synchronously with a workpiece supported between said work centers, a grinding wheel mounted on a slide which is movable toward and from the workpiece, a roller supporting means mounted on a frame on said traverse table, a plurality of cam rollers rotatably mounted on said roller supporting means coaxially and having different diameters, means operably connected to urge elastically said master cam toward said cam rollers for making engagement therebetween, power means operably connected to rotate said master cam and the workpiece synchronously in order to generate cam profile on the workpiece cooperating with said grinding wheel, roller changing means operable to change said cam rollers when the diameter of said grinding wheel has been reduced by predetermined size, said roller changing means comprising means for presenting to said master cam a different cam roller having a smaller diameter than that of a previously used cam roller, and position regulating means for locating said slide at a retracted position by a distance corresponding to the radius difference between a new cam roller and the previously used cam roller, whereby the lift error on the workpiece due to the diameter reduction of said grinding wheel is substantially compensated.

10. A cam grinding machine as claimed in claim 9, wherein said cam rollers are arranged coaxially with one another on at least a shank which is rotatably carried with said roller supporting means.

11. A cam grinding machine as claimed in claim 9, wherein each of said cam rollers is rotatably mounted on each of roller supporting shanks in alignment with one another, and said roller changing means including a thread formed on each of said shanks and at least a nut threadedly engaging with said thread for manual change.

12. A cam grinding machine comprising a base, a traverse table slidably mounted on said base, a swing table pivotably mounted on said traverse table, a headstock provided on said swing table including a rotatable spindle having a work center, a footstock mounted on said swing table having a work center, a plurality of master cams mounted on said spindle axially aligned with the work centers on said headstock and said footstock, said master cams being rotated synchronously with a workpiece supported between said work centers, a grinding wheel mounted on a slide which is movable toward and from the workpiece, a roller supporting means mounted on a frame on said traverse table, a plurality of rotatable cam rollers having different diameters and a common axis, shifting means for shifting said cam rollers through said roller supporting means by one pitch of said master cams when a cam profile generating process is performed, means operably connected to urge elastically said master cams toward said cam rollers for making engagement therebetween, power means operably connected to rotate said master cams and the workpiece synchronously in order to generate cam profiles on the workpiece cooperating with said grinding wheel, roller changing means mounted on said roller supporting means and comprising means for shifting said cam rollers in an axial direction to change said cam rollers when the diameter of said grinding wheel has been reduced by predetermined size, and position regulating means for locating said slide at a retracted position by a distance corresponding to the radius difference between a new cam roller, and the previously used cam roller, whereby the lift error on the workpiece due to the diameter reduction of said grinding wheel is substantially compensated.

13. A cam grinding machine as claimed in claim 12, wherein said cam rollers are arranged coaxially on at least a shank which is rotatably carried with said roller supporting means.

14. A cam grinding machine as claimed in claim 12, wherein said cam rollers are rotatably mounted respectively on roller supporting shanks in alignment with one another and said roller changing means includes a thread formed on each of said shanks and at least a nut threadedly engaging with said thread for manual change.

15. A cam grinding machine comprising a base, a traverse table slidably mounted on said base, a swing table pivotably mounted on said traverse table, a headstock provided on said swing table including a rotatable spindle having a work center, a footstock mounted on said swing table having a work center, at least one master cam mounted on said spindle and axially aligned with the work centers on said headstock and said footstock, said master cam being rotated synchronously with a workpiece supported between said work centers, a grinding wheel mounted on a slide which is movable toward and from the workpiece, a roller supporting means mounted on a frame on said traverse table, a plurality of cam rollers rotatably supported on said roller supporting means to provide different diameters, means operably connected to urge elastically said master cam toward said cam rollers for making engagement between a selected one of said cam rollers and said master cam at a time, power means operably connected to rotate said master cam and the workpiece synchronously in order to generate cam profile on the workpiece cooperating with said grinding wheel, and roller changing means mounted on said cam roller supporting means and comprising means for shifting said cam rollers in an axial direction when the diameter of said grinding wheel has been reduced by predetermined size, whereby the lift error on the workpiece due to the diameter reduction of said grinding wheel is substantially compensated.

16. A cam grinding machine comprising a base, a traverse table slidably mounted on said base, a swing table pivotably mounted on said traverse table, a headstock provided on said swing table including a rotatable spindle having a work center, a footstock mounted on said swing table having a work center, at least one master cam mounted on said spindle and axially aligned with the work centers on said headstock and said footstock, said master cam being rotated synchronously with a workpiece supported between said work centers, a grinding wheel mounted on a slide which is movable relative to the workpiece, a roller supporting means mounted on a frame on said traverse table, a plurality of cam roller means adapted to be rotatably supported on said roller supporting means and having different diameters, means operably connected to urge elastically said master cam toward said cam roller means for making engagement between one of said cam roller means and said master cam at a time, power means operably connected to rotate said master cam and the workpiece synchronously in order to generate cam profile on the workpiece cooperating with said grinding wheel, and roller changing means for presenting one of said cam roller means to engage with said master cam at the same position where the previously used cam roller was engaged when the diameter of said grinding has been reduced by predetermined size, whereby the lift error on the workpiece due to the diameter reduction of said grinding wheel is substantially compensated.

References Cited

UNITED STATES PATENTS

| | | | |
|---|---|---|---|
| 2,118,806 | 5/1938 | Brown | 51—101 |
| 2,323,189 | 6/1943 | Balsiger | 51—101 |
| 2,581,759 | 1/1952 | Green | 51—101 |
| 2,670,575 | 3/1954 | Reaser | 51—101 |

LESTER M. SWINGLE, Primary Examiner